United States Patent
Ko et al.

(10) Patent No.: US 10,873,103 B2
(45) Date of Patent: Dec. 22, 2020

(54) ELECTRODE ASSEMBLY AND RECHARGEABLE BATTERY INCLUDING THE SAME

(71) Applicant: SAMSUNG SDI CO., LTD., Yongin-si (KR)

(72) Inventors: Youngsan Ko, Yongin-si (KR); Kijun Kim, Yongin-si (KR); Yuhyun Kim, Yongin-si (KR); Junsik Lee, Yongin-si (KR); Woonsuk Jang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/276,743

(22) Filed: Feb. 15, 2019

(65) Prior Publication Data

US 2019/0260063 A1 Aug. 22, 2019

(30) Foreign Application Priority Data

Feb. 20, 2018 (KR) .................. 10-2018-0020028

(51) Int. Cl.
*H01M 4/02* (2006.01)
*H01M 10/04* (2006.01)
(Continued)

(52) U.S. Cl.
CPC .......... *H01M 10/045* (2013.01); *H01M 2/14* (2013.01); *H01M 2/26* (2013.01);
(Continued)

(58) Field of Classification Search
CPC ........ H01M 10/045; H01M 2/14; H01M 2/26; H01M 10/0436; H01M 10/052;
(Continued)

(56) References Cited

U.S. PATENT DOCUMENTS

2003/0099880 A1* 5/2003 Park .................. H01M 2/26
429/211
2011/0039146 A1 2/2011 Sato et al.
(Continued)

FOREIGN PATENT DOCUMENTS

JP 2003-257406 A 9/2003
JP 2010-103089 A 5/2010
(Continued)

OTHER PUBLICATIONS

Korean Office action dated Jun. 4, 2020.

*Primary Examiner* — Cynthia K Walls
(74) *Attorney, Agent, or Firm* — Lee IP Law, P.C.

(57) ABSTRACT

An electrode assembly and rechargeable battery, the electrode assembly including a first electrode including a first sub-electrode in which an active material is on both surfaces of a base substrate, a second sub-electrode in which the active material is on one surface of the base substrate, and a first electrode uncoated region extending from the first sub-electrode; a second electrode including a third sub-electrode in which an active material is on both surfaces of a base substrate, a fourth sub-electrode in which the active material is on one surface of the base substrate, and a second electrode uncoated region extending from the third sub-electrode; and a separator between the electrodes, wherein the active material at the third sub-electrode includes a protruding portion protruding therefrom, and a distance from the end of the active material at sides based on the third sub-electrode to the protruding portion is 0 to 3 mm.

12 Claims, 11 Drawing Sheets

(51) Int. Cl.
*H01M 2/14* (2006.01)
*H01M 2/26* (2006.01)
*H01M 10/052* (2010.01)
*H01M 10/0587* (2010.01)

(52) U.S. Cl.
CPC ..... *H01M 10/0436* (2013.01); *H01M 10/052* (2013.01); *H01M 10/0587* (2013.01)

(58) Field of Classification Search
CPC ......... H01M 10/0587; H01M 10/0525; H01M 4/139; H01M 4/0404; H01M 4/13; H01M 10/0431
See application file for complete search history.

(56) References Cited

U.S. PATENT DOCUMENTS

2014/0072851 A1\* 3/2014 Oh .................. H01M 2/26
429/94
2016/0141721 A1\* 5/2016 Mimura .................. H01M 2/26
429/162

FOREIGN PATENT DOCUMENTS

| JP | 5417241 B2 | 2/2014 |
| KR | 10-1735157 B1 | 5/2017 |
| KR | 10-2018-0014520 A | 2/2018 |

\* cited by examiner

ELECTRODE ASSEMBLY AND RECHARGEABLE BATTERY INCLUDING THE SAME

CROSS-REFERENCE TO RELATED APPLICATION

Korean Patent Application No. 10-2018-0020028 filed on Feb. 20, 2018, in the Korean Intellectual Property Office, and entitled: "Electrode Assembly and Rechargeable Battery Including the Same," is incorporated by reference herein in its entirety.

BACKGROUND

1. Field

Embodiments relate to an electrode assembly and a rechargeable battery including the same.

2. Description of the Related Art

A rechargeable battery is a power storage system that provides excellent energy density that can store electrical energy in a form of chemical energy.

Compared to non-rechargeable primary batteries, rechargeable secondary batteries can be recharged and used in IT devices such as smart phones, notebooks, and tablet PCs.

The above information disclosed in this Background section is only for enhancement of understanding of the background and therefore it may contain information that does not form the prior art that is already known in this country to a person of ordinary skill in the art.

SUMMARY

The embodiments may be realized by providing an electrode assembly that is spiral-wound about a winding axis, the electrode assembly including a first electrode including a first sub-electrode portion in which a first active material layer is respectively formed on both surfaces of a first base substrate, a second sub-electrode portion in which the first active material layer is formed on only one surface of the first base substrate, and a first electrode uncoated region extending from the first sub-electrode portion; a second electrode including a third sub-electrode portion in which a second active material layer is respectively formed on both surfaces of a second base substrate, a fourth sub-electrode portion in which the second active material layer is formed on only one surface of the second base substrate, and a second electrode uncoated region extending from the third sub-electrode portion; and a separator between the first electrode and the second electrode, wherein the second active material layer at the third sub-electrode portion includes a protruding portion protruding therefrom, and a distance from the end of the first active material layer disposed at both sides based on the third sub-electrode portion to the protruding portion is greater than 0 and less than 3 mm.

The third sub-electrode portion may be at an end of the second electrode that is proximate to the winding axis.

The protruding portion may include a first protruding portion and a second protruding portion respectively at opposite sides of the second base substrate, and a center line of the first protruding portion and a center line of the second protruding portion in a direction penetrating the second base substrate may be on a same line or may be laterally offset by a distance of less than 3 mm.

The center line of the first protruding portion and the center line of the second protruding portion may be on the same line.

The second electrode may be a negative electrode.

The protruding portion may be at a flat portion of the electrode assembly.

The embodiments may be realized by providing a rechargeable battery including the electrode assembly according to an embodiment; a case receiving the electrode assembly; and an electrolyte solution in the case.

The third sub-electrode portion may be at an end of the second electrode that is proximate to the winding axis.

The protruding portion may include a first protruding portion and a second protruding portion respectively at opposite sides of the second base substrate, and a center line of the first protruding portion and a center line of the second protruding portion in a direction penetrating the second base substrate may be on a same line or may be laterally offset by a distance of less than 3 mm.

The center line of the first protruding portion and the center line of the second protruding portion may be on the same line.

The second electrode may be a negative electrode.

The protruding portion may be at a flat portion of the electrode assembly.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Further, ordinals such as "first", "second", and "third" are used to avoid confusion between constituent elements.

A rechargeable battery according to an exemplary embodiment of the present disclosure will now be described in detail with reference to accompanying drawings.

Figure 1:
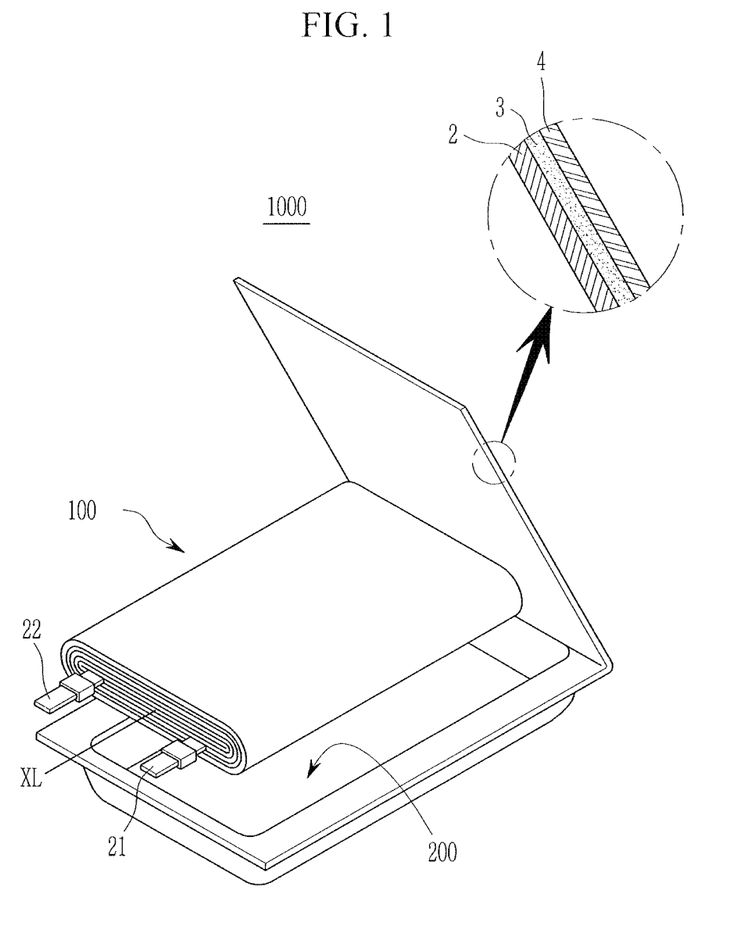
FIG. 1 illustrates a schematic exploded perspective view of a rechargeable battery according to an exemplary embodiment.
Figure 2:
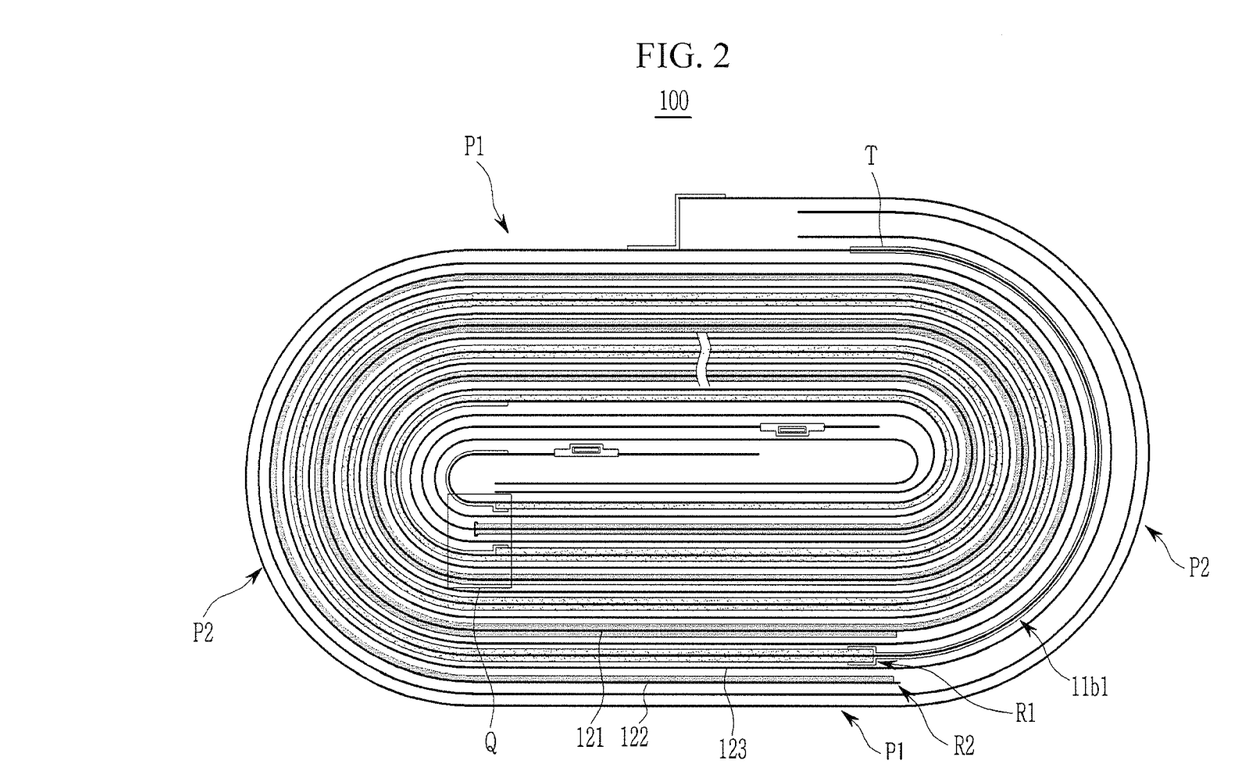
FIG. 2 illustrates a schematic transverse cross-sectional view of the electrode assembly of FIG. 1.
Figure 3:
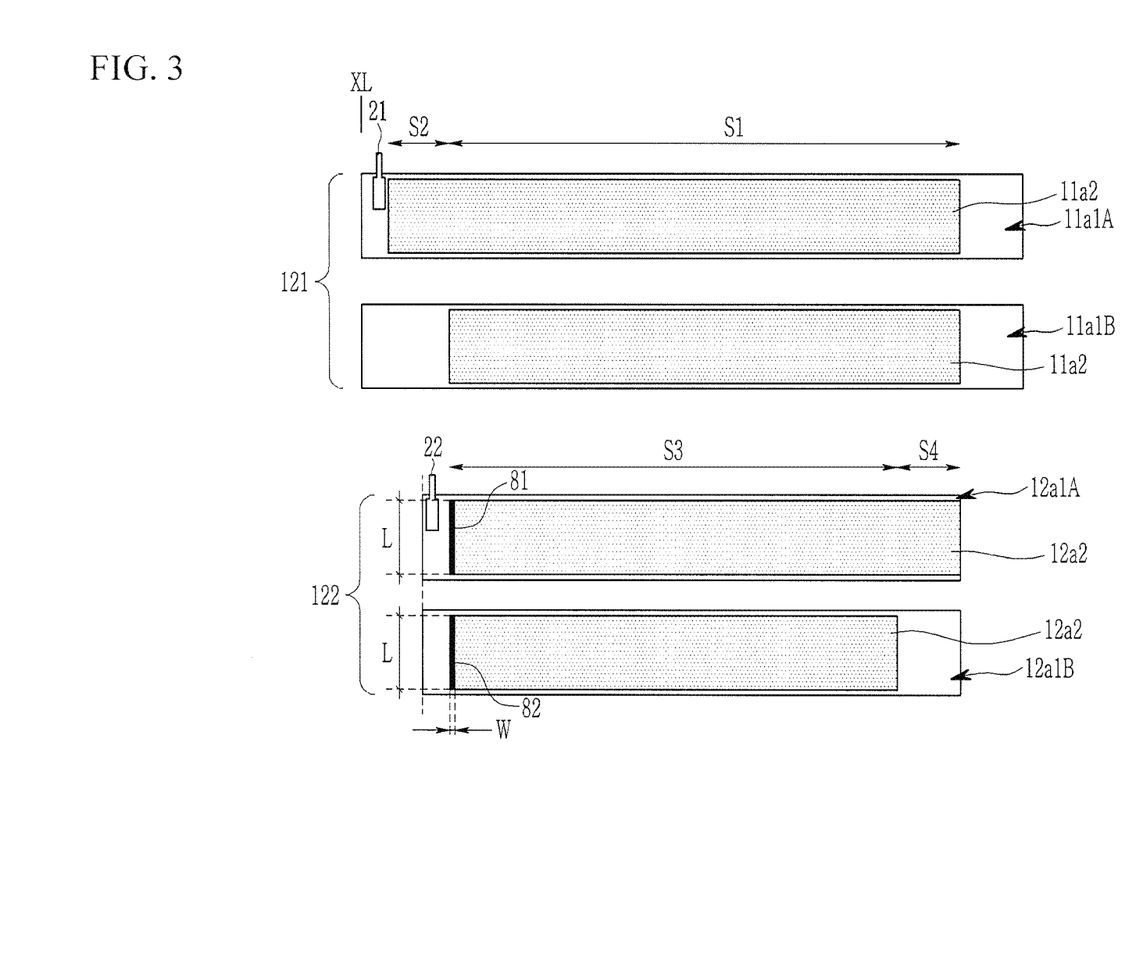
FIG. 3 illustrates a top plan view of a first electrode and a second electrode of the electrode assembly of FIG. 2.
Figure 4:
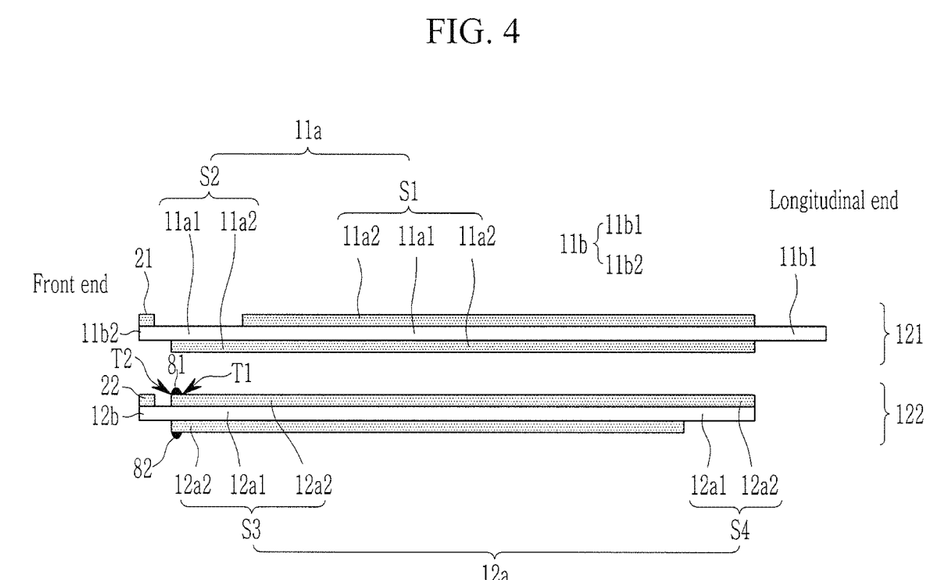
FIG. 4 illustrates a cross-sectional view of the first electrode and the second electrode of FIG. 3.

FIG. 1 illustrates an schematic exploded perspective view of a rechargeable battery according to an exemplary embodiment, FIG. 2 illustrates a schematic transverse cross-sectional view of the electrode assembly of FIG. 1, FIG. 3 illustrates a top plan view of a first electrode and a second electrode of the electrode assembly of FIG. 2, and FIG. 4 illustrates a cross-sectional view of the first electrode and the second electrode of FIG. 3.

As shown in FIG. 1, a rechargeable battery 1000 according to an exemplary embodiment of the present disclosure may include an electrode assembly 100 and a case 200.

Referring to FIGS. 1 and 2, the electrode assembly 100 may include a first electrode 121, a second electrode 122, and a separator 123 between the first electrode 121 and the second electrode 122.

The separator 123 may be for insulating, and the first electrode 121, the separator 123, the second electrode 122, and the separator 123 may be sequentially stacked.

The electrode assembly 100 may have a jelly roll shape in which the first electrode 121, the separator 123, and the second electrode 122 are spiral-wound based on, around, or about a winding axis XL (referring to FIG. 1) in the stacked state.

In an implementation, the electrode assembly 101 may be spirally wound and then flatly pressed, and a transverse cross-sectional taken in a vertical direction crossing the winding axis XL may be approximately elliptical.

Hereinafter, when the first electrode 121 and the second electrode 122 are wound around the winding axis XL, an end portion close or proximate to the winding axis XL (e.g., in a radial direction) may be referred to as a front end, and an end portion located relatively far away or distal to (e.g., in the radial direction) is referred to as a longitudinal end. For example, in an unwound state, an end of the electrode proximate to the winding axis XL may be referred to as a front end, and an end of the electrode distal to is referred to as a longitudinal end.

Referring to FIG. 3 and FIG. 4, the first electrode 121 may include a first electrode active region 11a and a first electrode uncoated region 11b, and the second electrode 122 may include a second electrode active region 12a and a second electrode uncoated region 12b.

The first electrode active region 11a may include a first sub-electrode portion S1 and a second sub-electrode portion S2 each having a first active material layer 11a2 formed on at least one surface of respective first base substrates 11a1.

The second electrode active region 12a may include a third sub-electrode portion S3 and a fourth sub-electrode portion S4 each including a second active material layer 12a2 formed on at least one surface of respective second base substrates 12a1.

For example, the first sub-electrode portion S1 may include the first active material layer 11a2 formed at both surfaces 11a1A and 11a1B of the respective first base substrates 11a1, and the second sub-electrode portion S2 may include the first active material layer 11a2 formed at only one surface of the respective first base substrates 11a1.

Also, the third sub-electrode portion S3 may include the second active material layer 12a2 formed at both surfaces 12a1A and 12a1B of the respective second base substrates 12a1, and the fourth sub-electrode portion S4 may include the second active material layer 12a2 formed at only one surface of the respective second base substrates 12a1.

The first base substrate 11a1 and the second base substrate 12a1 may be formed of a metal foil with a belt shape.

The second sub-electrode portion S2 may be at the longitudinal end of the first electrode 121, and the fourth sub-electrode portion S4 may be at the front end of the second electrode 122. In an implementation, as illustrated in FIG. 3, the second sub-electrode portion S2 may be at the front end of the first electrode 121.

The first base substrate 11a1 may provide a moving path of the charge generated from the first active material layer 11a2 and may support the first active material layer 11a2.

The first electrode 121 may be a positive electrode, and the first base substrate 11a1 may be a metal thin plate having excellent conductivity, e.g., an aluminum foil or a mesh structure.

The first active material layer 11a2 may be formed by dispersing an electrode mixture material including an electrode active material, a binder, and a conductor in a solvent to have a slurry form, and coating it to at least one side of the first base substrate 11a1 and then drying and compressing it.

The electrode active material of the first electrode active material layer may use a compound (e.g., lithiated intercalation compound) that can perform reversible intercalation and deintercalation of lithium, e.g., may one or more among composite oxides of a metal selected from cobalt, manganese, nickel, and combinations thereof, and lithium.

The second base substrate 12a1 provides a moving passage of the charge generated from the second active material layer 12a2 and may support the second active material layer 12a2.

The second electrode 122 may be a negative electrode, and the second base substrate 12a1 may be the metal thin plate having excellent conductivity, e.g., a copper foil, a nickel foil, or a mesh structure.

A thickness of the second base substrate may be 8 μm or less.

The second active material layer 12a2 may be formed by dispersing an electrode mixture material including an electrode active material, a binder, and a conductor in a solvent to have a slurry form, and coating it to at least one side of the second base substrate 12a1 and then drying and compressing it.

The electrode active material of the second active material layer may include a material that can perform reversible intercalation and deintercalation of lithium ions, a lithium metal, an alloy of the lithium metal, a material doping or dedoping lithium, or a transition metal oxide.

As a material that can perform reversible intercalation and deintercalation of lithium ions, a carbon-based material, e.g., a carbon-based negative active material that is suitable for a lithium ion secondary battery, may be used.

Examples of the carbon-based negative active material may include crystalline carbon, amorphous carbon, or a combination thereof.

An example of the crystalline carbon may be graphite such as amorphous, plate-shaped, flake, circular, or fiber-like natural or artificial graphite, and an example of the amorphous carbon may be a soft carbon (a low temperature calcined carbon), a hard carbon, a mesophase pitch-based carbide, calcined coke, or a combination thereof.

The active material of the second active material layer has a loading level of L/L 15 mg/cm$^2$ or more, and the active material may be a high density active material of 1.6 g/cc or more.

The first electrode uncoated region 11b and the second electrode uncoated region 12b may not include the active material layer, and may be parts of which the first base substrate 11a1 of the first electrode active region 11a and the second base substrate 12a1 of the second electrode active region 12a extend as an integral type of the first base substrate 11a 1 or the second base substrate 12a 1.

The first electrode uncoated region 11b may be at each of the front end and the longitudinal end of the first electrode 121, and may respectively extend from the first sub-electrode portion S1 and the second sub-electrode portion S2.

A first electrode current collecting part 21 (to draw out the charges formed by the chemical reaction) may be connected to the first electrode uncoated region 11b2 of the front end.

The first electrode current collecting part 21 may be connected to the first electrode uncoated region 11b2 by an ultrasonic welding, laser welding, or resistance welding method, and may be protruded outside the first electrode uncoated region 11b2.

The first electrode current collecting part 21 may include aluminum, like the first base substrate 11a1.

The first electrode uncoated region 11b1 of the longitudinal end extends by half turns of the electrode assembly, thereby overlapping the fourth sub-electrode portion S4 of the second electrode and being at the outmost of the electrode assembly 100.

The second electrode uncoated region 12b may be at the front end of the second electrode 122, and may extend from the third sub-electrode portion S3.

A second electrode current collecting part 22 (to draw out the charges formed by the chemical reaction) may be connected to the second electrode uncoated region 12b.

The second electrode current collecting part 22 may be connected by the same method as the first electrode uncoated region 11b2, and may protrude outside the second electrode uncoated region 12b.

The second electrode current collecting part 22 may include nickel.

After being spiral-wound, the first electrode current collecting part 21 and the second electrode current collecting part 22 may be separated and disposed to not be short-circuited.

The electrode assembly 100 may include a flat portion P1 having a relatively flat surface and a curved surface portion P2 that is relatively rounded.

The flat portion P1 may be a portion that is pressed after winding the electrode assembly 100, and the curved surface portion P2 may connect between two flat portions P1 that face each other.

One rotation in the electrode assembly 100 may include a pair of facing flat portions P1 and a pair of curved surface portions P2 connected to the ends of the flat portion.

In this case, the first electrode current collecting part 21 and the second electrode current collecting part 22 may be at the region corresponding to the flat portion P1.

In an implementation, the second active material layer 12a2 of the third sub-electrode portion S3 may include protruding portions 81 and 82 that protrude (e.g., relative to other portions of the second active material layer 12a2), and the protruding portions 81 and 82 may be at the flat portion P1.

The protruding portions 81 and 82 may be generated during the process of forming the second active material layer 12a2.

FIG. 5 to FIG. 8 illustrate stages in a process of forming an active material layer according to an exemplary embodiment.

Figure 5:
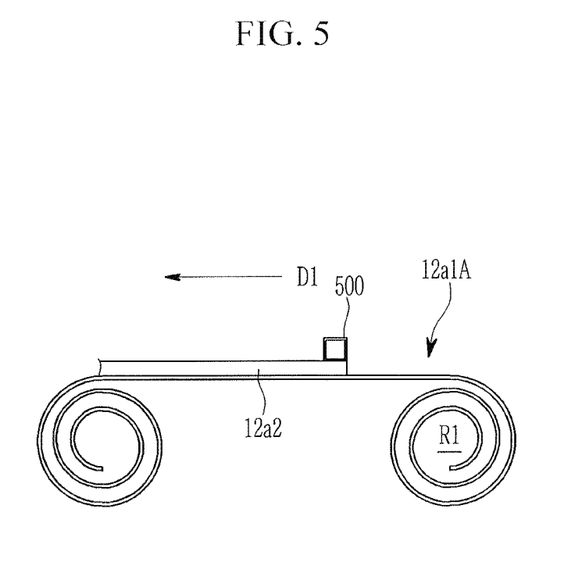
FIG. 5 to FIG. 8 illustrate stages in a process of forming an active material layer according to an exemplary embodiment.

As shown in FIG. 5, the negative active material may be coated with the slurry on one surface 12a1A of the second base substrate 12a1 by using a coating device 500 to form the second active material layer 12a2.

For example, the negative active material may be continuously coated on the base substrate in one direction D1.

Thereafter, a rolling process using a drying and a roller may be performed.

The continuously supplied second base substrate 12a1 may be rolled to the first roller R1 in the state that the second active material layer 12a2 is formed.

Figure 6:
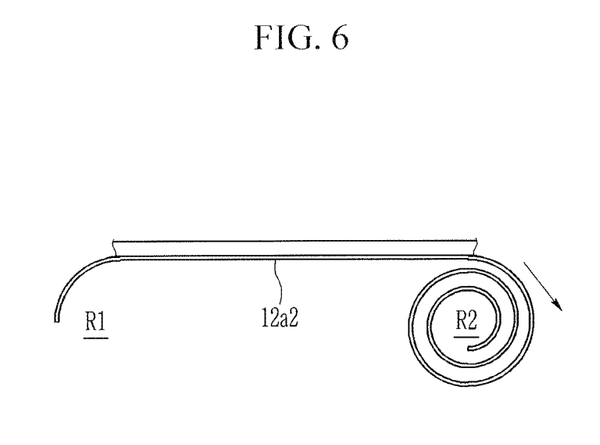

Then, as shown in FIG. 6, rewinding of the second base substrate 12a1 that is wrapped around the first roller R1 to the second roller R2 may be performed.

Figure 7:
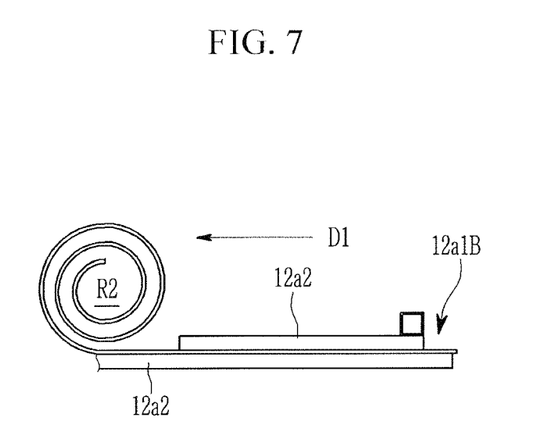

Next, as shown in FIG. 7, the slurry may be coated on the other surface 12a1B of the continuously supplied base substrate in one direction D1 by the same method as shown in FIG. 5 to form the second active material layer 12a2.

In this case, as shown in FIG. 6, the coating may be performed after the rewinding, in FIG. 7, the direction of the coating from one side of the second base substrate 12a1 to the other side may be the same as that shown in FIG. 5, and the coating may be continued to the same other side.

This is to form the first protruding portion 81 and the second protruding portion 82 (generated as the second active material layer 12a1 is added) at the same position when the coating device 500 is separated from the second active material layer 12a2 after the coating process.

Accordingly, an imaginary or virtual center line of the first protruding portion 81 and of the second protruding portion 82 penetrating the second base substrate 12a1 may be on the same line (e.g., the first protruding portion 81 may be aligned with the second protruding portion 82). In an implementation, they may be slightly mismatched or misaligned with each other depending on a process error.

For example, the center line of the first protruding portion 81 and the center line of the second protruding portion 82 may be displaced or misaligned by 3 mm or less.

Figure 8:
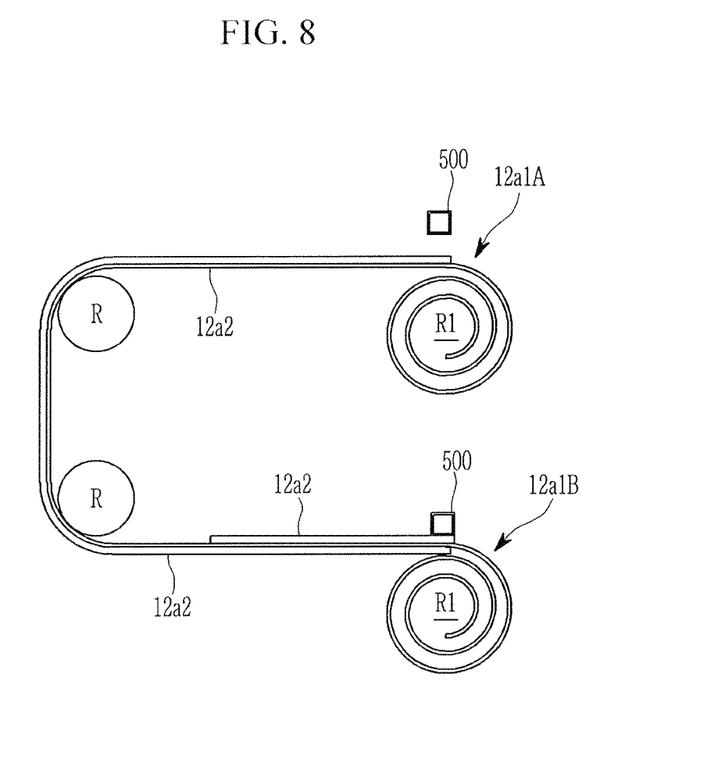

On the other hand, as shown in FIG. 8, if a roller R were to be added, without the rewinding process, by coating the slurry on both surfaces of the second base substrate 12a from the same side to the other side, the center lines of the first protruding portion 81 and the second protruding portion 82 may be disposed on the same line.

Figure 9:
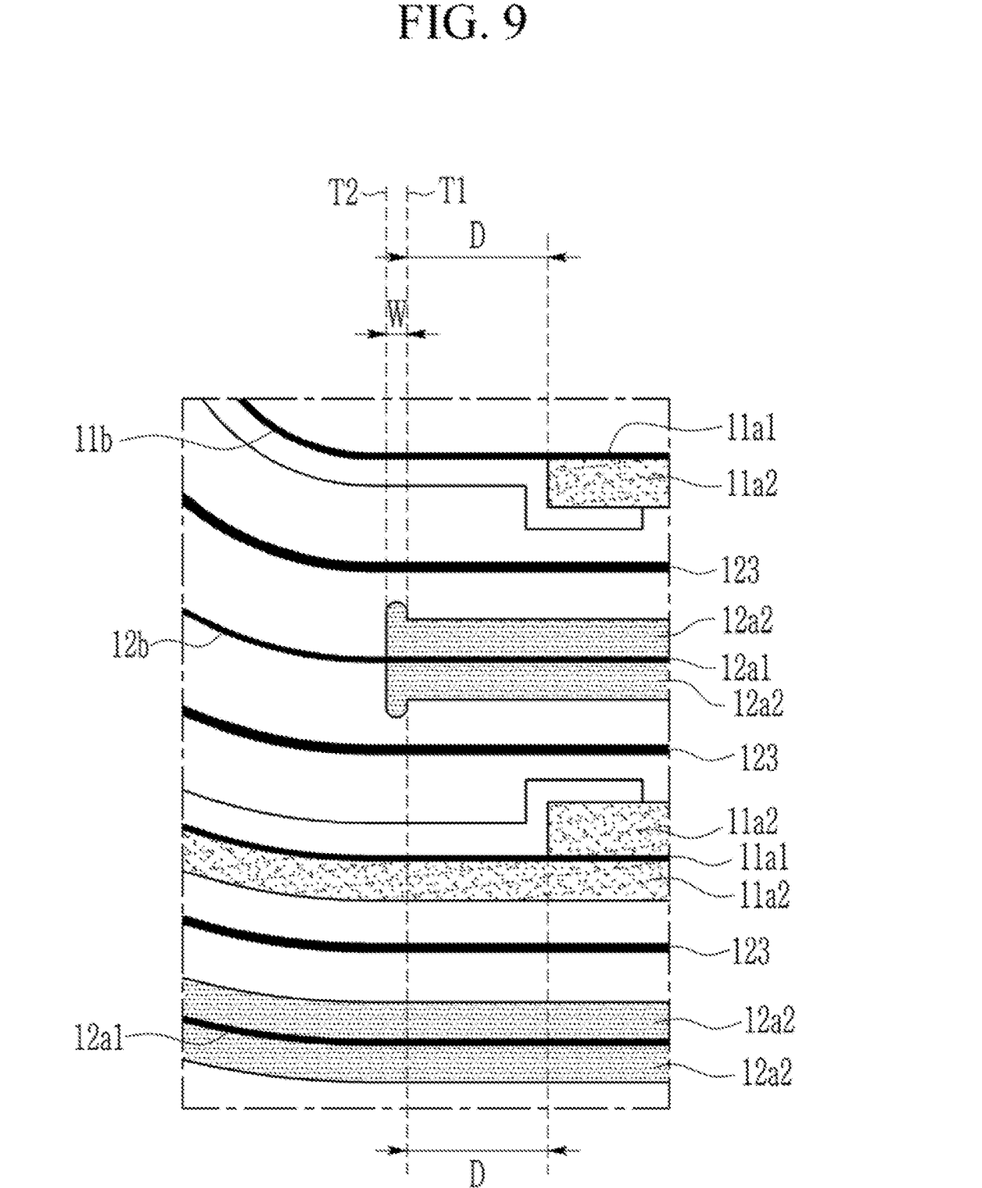
FIG. 9 illustrates an enlarged view of a portion Q of FIG. 2.

FIG. 9 illustrates an enlarged view of a portion Q of FIG. 2.

Referring to FIG. 3, FIG. 4, and FIG. 9, the protruding portions 81 and 82 may be respectively protruded from both surfaces of the second base substrate 12a1 and may be adjacent to the edge of the third sub-electrode portion S3, e.g., the boundary between the second base substrate 12a1 and the second active material layer 12a2.

The protruding portions 81 and 82 may be elongated along the width direction of the second active material layer 12a2. A length L of the protruding portions 81 and 82 extending in the width direction may be the same as a width of a nozzle or a slit used to form the second active material layer 12a2.

Also, the direction intersecting the length of the protruding portions 81 and 82, e.g., the progressing direction of the coating of the second active material layer 12a2 on the second base substrate 12*a*1, may be a direction of the width W of the protruding portions 81 and 82.

In an implementation, the width W of the protruding portions 81 and 82 as a distance from an inner boundary line T1 to an outer boundary line T2 may be, e.g., 3 mm or less.

In an implementation, a height of the protruding portions 81 and 82 based on or in a direction perpendicular to one surface of the second base substrate 12*a*1 may be greater than 3% of the thickness of the second base substrate 12*a*1.

In this case, the outer boundary line T2 is the boundary line of the second base substrate 12*a*1 and the second active material layer 12*a*2, and the inner boundary line T1 is the boundary of the position where the protruding portions 81 and 82 start from one surface of the second active material layer 12*a*2.

Based on the center of the third sub-electrode portion S3 at which the protruding portions 81 and 82 are formed, the end of the first active material layer 11*a*2 of the second sub-electrode portion S2 may be at one side, and the end of the first active material layer 11*a*2 of the first sub-electrode portion S1 may be at the other side.

In this case, the end of the second sub-electrode portion S2 may be at the boundary between the first base substrate 11*a*1 and the second sub-electrode portion S2, and the end of the first sub-electrode portion S1 may be at the boundary of the first sub-electrode portion S1 and the second sub-electrode portion S2.

Each of the inner boundary lines T1 of the protruding portions 81 and 82 may be separated from the end of the first active material layer of the first sub-electrode portion S1 and the second sub-electrode portion S2 by a predetermined distance, and a separation distance D may be, e.g., more than 0 mm to 3 mm or less.

In an implementation, the protruding portions 81 and 82 may be respectively formed at one surface and the other surface of the third sub-electrode portion S3, and may be disposed to be mismatched with each other with respect to the imaginary center lines penetrating one surface and the other surface.

Accordingly, the center lines of the protruding portions 81 and 82 at one surface and the other surface may be separated or offset, and a separation distance between the center lines may be 3 mm or less.

In an implementation, the protruding portions 81 and 82 formed at the second electrode 122 may be laterally separated from the end of the first active material layer 11*a*2 formed at the first electrode 121, and an undesirable phenomenon of the lithium precipitation may not occur.

In an implementation, the protruding portion may be formed at the third sub-electrode portion of the second electrode. In an implementation, the protruding portion may be formed at the first sub-electrode portion of the first electrode as the positive electrode, depending on the stacking form of the electrode assembly.

In this case, the protruding portion may be laterally separated from the end of the second active material layer 12*a*2 formed at the second electrode 122 by the predetermined distance, and the separation distance may be over 0 mm to 3 mm or less.

A protection tape T may cover the boundary between the first electrode uncoated region 11*b* and the first electrode active region 11*a*, e.g., the step formed between the first electrode uncoated region 11*b* and the first active material layer 11*a*2 due to the first active material layer 11*a*2 formed at the first electrode active region 11*a*.

In an implementation, the protection tape T may be additionally attached to prevent overlapping areas from affecting each other.

The separator 123 may be between the first electrode 121 and the second electrode 122, and prevents a short circuit therebetween.

The separator 123 may be formed of a porous film having high ion permeability and mechanical strength.

For example, the separator 123 may be formed of an olefin-based polymer such as polyethylene, polypropylene, or the like.

The separator may extend beyond the first electrode active region 11*a* or the second electrode active region 12*a* according to the length direction or the width direction, thereby preventing short circuiting between the first electrode active region 11*a* and the second electrode active region 12*a* from being generated depending on thermal contraction.

Referring to FIG. 1, the electrode assembly 100 may be received in a pouch-type case 200 with the electrolyte.

The pouch-type case 200 may be formed of a laminate sheath, and the laminate sheath may be formed, for example, of a multi-layered structure having a first insulating layer 2, a metal layer 3, and a second insulating layer 4.

Other adhesives and functional layers may also be added.

The first insulating layer 2 may be formed of an insulating and thermally adhesive material on the inner surface of the laminate sheath, and may be sealed by thermally-melting the edge in a state that the electrode assembly 100 is received.

The first insulating layer 2 may be formed on one surface of the metal layer 3, and may form the inner surface of the laminate sheath opposite to the electrode assembly 100.

The first insulating layer 2 may be formed of casted polypropylene (CPP) that does not react with the electrolyte solution and or its equivalent.

In an implementation, the electrode assembly 100 may be be placed in a square or cylindrical case with the electrolyte.

Figure 10:
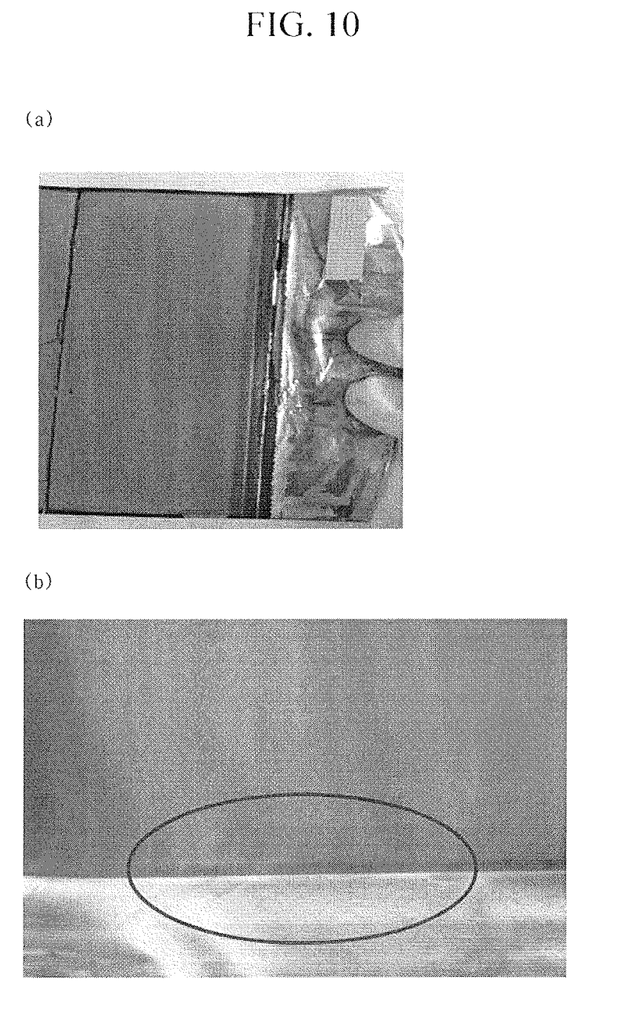
FIG. 10 illustrates an image of a rechargeable battery according to an exemplary embodiment after use.
Figure 11:
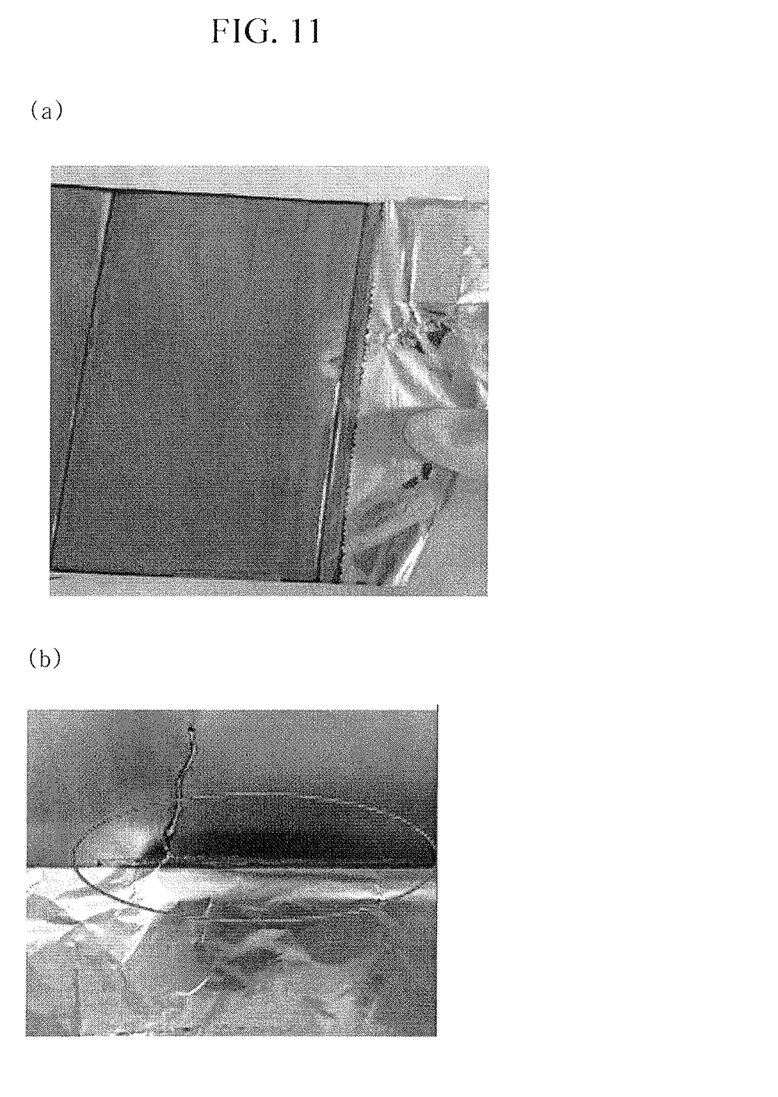
FIG. 11 illustrates a photograph of a rechargeable battery according to a comparative example after use.

FIG. 10 illustrates an image of a rechargeable battery according to an exemplary embodiment after use, and FIG. 11 illustrates an image of a rechargeable battery according to a comparative example after use.

Part (b) of FIG. 10 illustrates an enlarged portion of part (a) of FIG. 10. Part (b) of FIG. 11 illustrates an enlarged portion of part (a) of FIG. 11.

The rechargeable battery according to a comparative example of FIG. 11 may be formed at a different end from the protruding portion, and the protruding portion and the first active material layer may be overlapped.

The active material layer used in FIG. 10 and FIG. 11 may be an active material containing artificial graphite and a rolled product with a density of 1.65 g/cc.

As shown in FIG. 10, it may be seen that the lithium is not precipitated after using the rechargeable battery according to an embodiment. As may be seen in FIG. 11, the lithium is precipitated after using the rechargeable battery according to the comparative example.

For example, as shown in FIG. 10, it may be seen that a shade of the portion where lithium is not precipitated is the shade of the active material layer, which appears as dark gray or black, and on the other hand, as shown in FIG. 11, the portion where lithium is precipitated is discolored rather than having the shade of the active material layer.

By way of summation and review, with a view toward environmental problems and exhaustion of fossil fuels, interest in electric vehicles has increased, and electric vehicles are using rechargeable batteries.

Rechargeable batteries may have characteristics such as high density, high power, and safety according to this tendency.

A rechargeable battery may include an electrode assembly in which a positive electrode, a negative electrode, and a separator are laminated, and the positive electrode and the negative electrode may include an active material layer formed on a base substrate made of a metal.

In this case, to obtain uniform characteristics of the rechargeable battery, the active material layer may be formed on the base substrate with a uniform thickness and may be coated on the base substrate by using coating devices such as a die coater, a die coater, etc.

The active material layer may be applied in a slurry state, and when the coating device is separated from the active material layer after the coating by the coating device is finished, the already-applied active material layer may be attached to a nozzle of the coating device such that a protruding portion may be formed.

A loading level when coating the active material layer and the density of the active material layer may also increase due to the characteristics of rechargeable batteries having high density and high power.

As the loading level of the active material layer coating the active material increases and the density of the active material layer increases, the size and generation rate of the protruding portion could also be increased at the end of the active material layer.

This protruding portion may be non-uniformly formed, and could result in lithium precipitation and a side reaction to deteriorate the characteristics of the battery.

As above-described, if the rechargeable battery is manufactured according to an embodiment, the lithium precipitation may be prevented, thereby providing a rechargeable battery with long life, high density, and high power.

One or more embodiments may provide an electrode assembly with which the characteristics of the battery are prevented from being deteriorated even if the protruding portion is formed when forming the active material layer by slurry coating.

According to an embodiment, the end of the active material layer of the opposing electrode is separated from the protruding portion formed when forming the active material layer, and a rechargeable battery without generation of the lithium precipitation may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode assembly that is spiral-wound about a winding axis, the electrode assembly comprising:
   a first electrode including:
      a first sub-electrode portion in which a first active material layer is respectively formed on both surfaces of a first base substrate,
      a second sub-electrode portion in which the first active material layer is formed on only one surface of the first base substrate, and
      a first electrode uncoated region extending from the first sub-electrode portion;
   a second electrode including:
      a third sub-electrode portion in which a second active material layer is respectively formed on both surfaces of a second base substrate,
      a fourth sub-electrode portion in which the second active material layer is formed on only one surface of the second base substrate, and
      a second electrode uncoated region extending from the third sub-electrode portion; and
   a separator between the first electrode and the second electrode,
   wherein:
   the second active material layer at the third sub-electrode portion includes a protruding portion protruding therefrom, and
   a lateral distance from the end of the first active material layer, disposed at either a top side or a bottom side of the third sub-electrode portion, to an inner boundary of the protruding portion is greater than 0 and less than 3 mm.

2. The electrode assembly as claimed in claim 1, wherein the third sub-electrode portion is at an end of the second electrode that is proximate to the winding axis.

3. The electrode assembly as claimed in claim 1, wherein:
   the protruding portion includes a first protruding portion and a second protruding portion respectively at opposite sides of the second base substrate, and
   a center line of the first protruding portion and a center line of the second protruding portion in a direction penetrating the second base substrate are on a same line or are laterally offset by a distance of less than 3 mm.

4. The electrode assembly as claimed in claim 3, wherein the center line of the first protruding portion and the center line of the second protruding portion are on the same line.

5. The electrode assembly as claimed in claim 1, wherein the second electrode is a negative electrode.

6. The electrode assembly as claimed in claim 1, wherein the protruding portion is at a flat portion of the electrode assembly.

7. A rechargeable battery, comprising:
   the electrode assembly as claimed in claim 1;
   a case receiving the electrode assembly; and
   an electrolyte solution in the case.

8. The rechargeable battery as claimed in claim 7, wherein the third sub-electrode portion is at an end of the second electrode that is proximate to the winding axis.

9. The rechargeable battery as claimed in claim 7, wherein:
   the protruding portion includes a first protruding portion and a second protruding portion respectively at opposite sides of the second base substrate, and
   a center line of the first protruding portion and a center line of the second protruding portion in a direction penetrating the second base substrate are on a same line or are laterally offset by a distance of less than 3 mm.

10. The rechargeable battery as claimed in claim 9, wherein the center line of the first protruding portion and the center line of the second protruding portion are on the same line.

11. The rechargeable battery as claimed in claim 7, wherein the second electrode is a negative electrode.

12. The rechargeable battery as claimed in claim 7, wherein the protruding portion is at a flat portion of the electrode assembly.

\* \* \* \* \*